United States Patent
Renschler et al.

(10) Patent No.: US 10,681,021 B2
(45) Date of Patent: Jun. 9, 2020

(54) SELECTIVE ADMISSION INTO A NETWORK SHARING SESSION

(75) Inventors: Martin H. Renschler, San Diego, CA (US); Frederick D. Kim, Carlsbad, CA (US); Patrik Lundqvist, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 584 days.

(21) Appl. No.: 13/150,784

(22) Filed: Jun. 1, 2011

(65) Prior Publication Data

US 2012/0311165 A1 Dec. 6, 2012

(51) Int. Cl.
| | |
|---|---|
| *G06F 15/16* | (2006.01) |
| *H04L 29/06* | (2006.01) |
| *H04W 12/00* | (2009.01) |
| *H04W 84/18* | (2009.01) |

(52) U.S. Cl.
CPC ......... *H04L 63/0492* (2013.01); *H04L 63/18* (2013.01); *H04W 12/003* (2019.01); *H04L 63/1466* (2013.01); *H04W 12/00522* (2019.01); *H04W 84/18* (2013.01)

(58) Field of Classification Search
USPC .............. 709/227, 228; 715/753; 726/6
See application file for complete search history.

(56) References Cited

U.S. PATENT DOCUMENTS

| | | | |
|---|---|---|---|
| 6,012,102 A * | 1/2000 | Shachar ............................ 710/5 |
| 6,523,116 B1 * | 2/2003 | Berman ......................... 713/182 |
| 7,401,224 B2 * | 7/2008 | Gantman et al. ............. 713/170 |
| 7,464,272 B2 * | 12/2008 | Danieli .................... A63F 13/12 |
| | | | 380/251 |
| 7,471,200 B2 * | 12/2008 | Otranen ...................... 340/572.1 |
| 7,657,255 B2 * | 2/2010 | Abel et al. ................. 455/414.1 |
| 7,787,820 B2 | 8/2010 | Hillyard |
| 8,171,292 B2 * | 5/2012 | Brown et al. ................. 713/171 |

(Continued)

FOREIGN PATENT DOCUMENTS

| | | |
|---|---|---|
| CN | 101286839 A | 10/2008 |
| EP | 1335563 A2 | 8/2003 |

(Continued)

OTHER PUBLICATIONS

Alfred J . Menezes, Paul C. van Oorschot, and Scott A. Vanstone. "Handbook of Applied Cryptography." CRC Press: 1996. Chapter 1.*

(Continued)

*Primary Examiner* — Quang N Nguyen
(74) *Attorney, Agent, or Firm* — Arent Fox, LLP (57) ABSTRACT

A system and method provide for the selective authorization and admission of a client into a data sharing session with a host. A host may select one or more clients into the sharing session based on the proximity of the clients. When a client is selected, an identifier is provided from the client device to the host device, for example, utilizing an optical identifier such as a bar code or an audible identifier such as an encoded sound. The identifier is then utilized to establish a link between the client and the host. In this fashion any number of client devices may be selectively admitted into the sharing session in a quick and easy process enabling security for the host and anonymity for the client.

17 Claims, 7 Drawing Sheets

(56) References Cited

U.S. PATENT DOCUMENTS

| | | | |
|---|---|---|---|
| 8,850,052 B2* | 9/2014 | Rosenblatt | H04L 12/2812 709/212 |
| 2002/0016153 A1 | 2/2002 | Sato et al. | |
| 2003/0067908 A1* | 4/2003 | Mattaway | H04L 1/0083 370/352 |
| 2003/0172271 A1* | 9/2003 | Silvester | 713/170 |
| 2004/0003250 A1* | 1/2004 | Kindberg et al. | 713/171 |
| 2004/0107170 A1 | 6/2004 | Labrou et al. | |
| 2005/0203912 A1* | 9/2005 | Beach et al. | 707/10 |
| 2005/0283480 A1* | 12/2005 | Berglund et al. | 707/10 |
| 2006/0165060 A1* | 7/2006 | Dua | G06Q 20/20 370/352 |
| 2006/0174116 A1* | 8/2006 | Balfanz et al. | 713/168 |
| 2006/0291662 A1* | 12/2006 | Takahashi et al. | 380/278 |
| 2007/0079135 A1* | 4/2007 | Saito | 713/183 |
| 2007/0109989 A1* | 5/2007 | Nakagawa | H04W 84/20 370/328 |
| 2007/0291944 A1* | 12/2007 | Wingert et al. | 380/258 |
| 2008/0004888 A1 | 1/2008 | Davis et al. | |
| 2008/0056214 A1* | 3/2008 | Low et al. | 370/338 |
| 2008/0057867 A1* | 3/2008 | Trappeniers et al. | 455/41.2 |
| 2008/0059372 A1 | 3/2008 | Lee et al. | |
| 2008/0162937 A1* | 7/2008 | Kohlenberg et al. | 713/171 |
| 2008/0268776 A1* | 10/2008 | Amendola | 455/41.2 |
| 2009/0201896 A1 | 8/2009 | Davis et al. | |
| 2010/0009675 A1* | 1/2010 | Wijting | H04W 72/02 455/426.1 |
| 2010/0010320 A1* | 1/2010 | Perkins et al. | 600/300 |
| 2010/0040029 A1* | 2/2010 | Doppler | H04W 28/18 370/338 |
| 2010/0082784 A1* | 4/2010 | Rosenblatt | H04L 12/2812 709/222 |
| 2010/0088390 A1* | 4/2010 | Bai et al. | 709/217 |
| 2010/0138481 A1* | 6/2010 | Behrens | 709/203 |
| 2010/0162412 A1 | 6/2010 | Muraki | |
| 2010/0227549 A1* | 9/2010 | Kozlay | 455/26.1 |
| 2010/0262828 A1* | 10/2010 | Brown et al. | 713/171 |
| 2011/0081860 A1* | 4/2011 | Brown et al. | 455/41.3 |
| 2011/0221590 A1* | 9/2011 | Baker et al. | 340/539.12 |
| 2012/0112726 A1 | 5/2012 | Kaihori et al. | |
| 2012/0311165 A1* | 12/2012 | Renschler | H04L 63/0492 709/228 |
| 2014/0359482 A1* | 12/2014 | Sinn | H04W 4/21 715/753 |
| 2016/0212178 A1* | 7/2016 | Zhang | H04L 65/4015 |
| 2016/0378422 A1* | 12/2016 | Kenjalkar | G06F 3/1423 726/6 |
| 2017/0123751 A1* | 5/2017 | Sigurşson | H04L 67/02 |
| 2017/0359456 A1* | 12/2017 | Shrubsole | G06F 1/163 |

FOREIGN PATENT DOCUMENTS

| | | | |
|---|---|---|---|
| EP | 1551140 A1 | 7/2005 | |
| EP | 1940115 A2 | 7/2008 | |
| EP | 2018032 A1 | 1/2009 | |
| EP | 2306692 A1 | 4/2011 | |
| GB | 2449510 A | 11/2008 | |
| JP | 2001351155 A | 12/2001 | |
| JP | 2003513513 A | 4/2003 | |
| JP | 2003309558 A | 10/2003 | |
| JP | 2005039429 A | 2/2005 | |
| JP | 3669293 B2 | 7/2005 | |
| JP | 2005190285 A | 7/2005 | |
| JP | 2005223896 A | 8/2005 | |
| JP | 2008178092 A | 7/2008 | |
| JP | 2009135688 A | 6/2009 | |
| JP | 2009200933 A | 9/2009 | |
| JP | 4377679 B2 | 12/2009 | |
| JP | 2010146452 A | 7/2010 | |
| WO | 0131836 A2 | 5/2001 | |
| WO | 2007045937 A1 | 4/2007 | |
| WO | WO 2008132241 A2 * | 11/2008 | |
| WO | 2011030522 A1 | 3/2011 | |

OTHER PUBLICATIONS

Alfred J. Menezes, Paul C. van Oorschot, and Scott A. Vanstone. "Handbook of Applied Cryptography." CRC Press: 1996. Chapter 8.*

Dan Zhou. "Security Issues in Ad Hoc Networks." Chapter 32 in "The Handbook of Ad Hoc Wireless Networks." Edited by Mohammad Llyas. CRC Press: 2002. 14 pages.*

Dirk Balfanz, D. K. Smetters, Paul Stewart, and H. Chi Wong. "Talking to Strangers: Authentication in Ad-Hoc Wireless Networks". In "Proceedings of the Network and Distributed System Security Symposium, NDSS 2002": 2002 (month unknown). 13 pages.*

William Claycomb and Dongwan Shin. "Using a Two Dimensional Colorized Barcode Solution for Authentication in Pervasive Computing". 2006 ACS/IEEE International Conference on Pervasive Services; Jun. 26-29, 2006; pp. 173-180.*

William R. Claycomb and Dongwan Shin. "Secure Device Pairing Using Audio". 43rd Annual 2009 International Carnahan Conference on Security Technology, 2009. Oct. 5-8, 2009. pp. 77-84.*

Dongwan Shin, William Claycomb, Seunghyun Im. "A visual way to talk to strangers: authentication in wireless pervasive computing." in International Journal of Ad Hoc and Ubiquitous Computing (IJAHUC), vol. 5, No. 4. Apr. 2010. pp. 252-260.*

Arun Kumara, Nitesh Saxena, Gene Tsudik, Ersin Uzunb. "A comparative study of secure device pairing methods." In "Pervasive and Mobile Computing", Jul. 18, 2009. pp. 734-749.*

Klaus Doppler, Mika Rinne, Carl Wijting, Cássio B. Ribeiro, and Klaus Hugl. "Device-to-Device Communication as an Underlay to LTE-Advanced Networks". IEEE Communications Magazine, Dec. 2009. pp. 42-49.*

Alan B. Johnston and Daniel Schutzer. Chapter 15: "Peer-to-Peer SIP" in "SIP". Norwood, US: Artech House Publishers, Sep. 2009. pp. 331-342.*

International Search Report and Written Opinion—PCT/US2012/040610—ISA/EPO—dated Oct. 25, 2012.

Yashima N., "I'm in love with iPhone App, we can exchange business cards by high five!" Weekly ASCII PLUS, Apr. 10, 2009, iPhone & iPad App Review, [Search date: Oct. 8, 2014], Internet URL <http://weekly.ascii.jp/elem/000/000/011/11124/>.

IPAISEC: "Report on the Status of Authentication Technology," Japan, Information-technology Promotion Agency, Security Center, Mar. 2003, pp. 13-18.

* cited by examiner

SELECTIVE ADMISSION INTO A NETWORK SHARING SESSION

BACKGROUND

Field

The present disclosure relates generally to access control in computer networks, and more particularly, to the authorization of a participant to enter into a data sharing session with a host.

Background

Mobile devices as well as stationary multimedia-capable devices may wish to engage in temporary sessions with a limited audience to share media or conduct other electronic data transfer. Such sessions are often of a temporary nature, and session participants may be anonymous and may wish to stay anonymous throughout the sharing session.

Individual pairing of session participants with hosts via manually entered pass codes, or adding participants or devices to a friend list or friendly devices list, is cumbersome and in many current implementations permanent. Additionally, many current solutions for access control require discovery of devices by scanning across many possible wireless channels or codes, which can take longer than tolerable for short term ad-hoc sessions with many participants.

Thus, there is a need in the field for an improved access control process for enabling temporary admission in a quick, easy, and secure fashion.

SUMMARY

In various representative aspects, the present disclosure provides for the selective authorization of multimedia devices in a way that can enable the temporary, controlled sharing of data from a host with one or more chosen clients.

Exemplary features include the selective authorization by a host of one or more clients who wish to participate in a sharing session. Here, the selective authorization may be made in an arm's length fashion, that is, by a user of a host device being face-to-face with a user of a client device, and making a decision to authorize that user's client device into the sharing session. Upon the decision to admit the client device, the host device may be placed in proximity to the client device so that the client device can provide an audio or visual identifier to the host device, such that the host can individually and reliably authorize client devices for the session. Here, the client device can retain a level of anonymity, in that a limited amount of information may be provided to the host device in order to establish the sharing session. In this way, the host of the session may quickly and easily visually identify and grant access individually to each client rather than giving out a single pass code for all participants.

In one aspect, the disclosure provides a method of selective authorization, including determining to admit a client device into a network sharing session with a host device, detecting that the client device is proximate to the host device, receiving an identifier from the admitted client device for identifying the admitted client device, and establishing the network sharing session utilizing the identifier.

Another aspect of the disclosure provides a method of joining a network sharing session with a host device, including providing, from an admitted client device admitted into the sharing session, an identifier for identifying the admitted client device to the host device; and establishing a link with the host device for communication over the sharing session.

Another aspect of the disclosure provides an apparatus for selective authorization, including a processor and a memory coupled to the processor. Here, the processor is configured to determine to admit a client device into a network sharing session with a host device, to detect that the client device is proximate to the host device, to receive an identifier from the admitted client device for identifying the admitted client device, and to establish the network sharing session utilizing the identifier.

Another aspect of the disclosure provides an apparatus for joining a network sharing session with a host device, including a processor and a memory coupled to the processor. Here, the processor is configured to provide, from an admitted client device admitted into the sharing session, an identifier for identifying the admitted client device to the host device, and to establish a link with the host device for communication over the sharing session.

Another aspect of the disclosure provides an apparatus for selective authorization, including means for determining to admit a client device into a network sharing session with a host device, means for detecting that the client device is proximate to the host device, means for receiving an identifier from the admitted client device for identifying the admitted client device, and means for establishing the network sharing session utilizing the identifier.

Another aspect of the disclosure provides an apparatus for joining a network sharing session with a host device, including means for providing, from an admitted client device admitted into the sharing session, an identifier for identifying the admitted client device to the host device, and means for establishing a link with the host device for communication over the sharing session.

Another aspect of the disclosure provides a computer program product including a computer-readable medium having instructions for causing a computer to determine to admit a client device into a network sharing session with a host device, instructions for causing a computer to detect that the client device is proximate to the host device, instructions for causing a computer to receive an identifier from the admitted client device for identifying the admitted client device, and instructions for causing a computer to establish the network sharing session utilizing the identifier.

Another aspect of the disclosure provides a computer program product including a computer-readable medium having instructions for causing a computer to provide, from an admitted client device admitted into a sharing session, an identifier for identifying the admitted client device to a host device hosting the sharing session, and instructions for causing a computer to establish an initial link between the host and client device for communication to set up participation in the shared session.

These and other aspects are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a network access control system will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
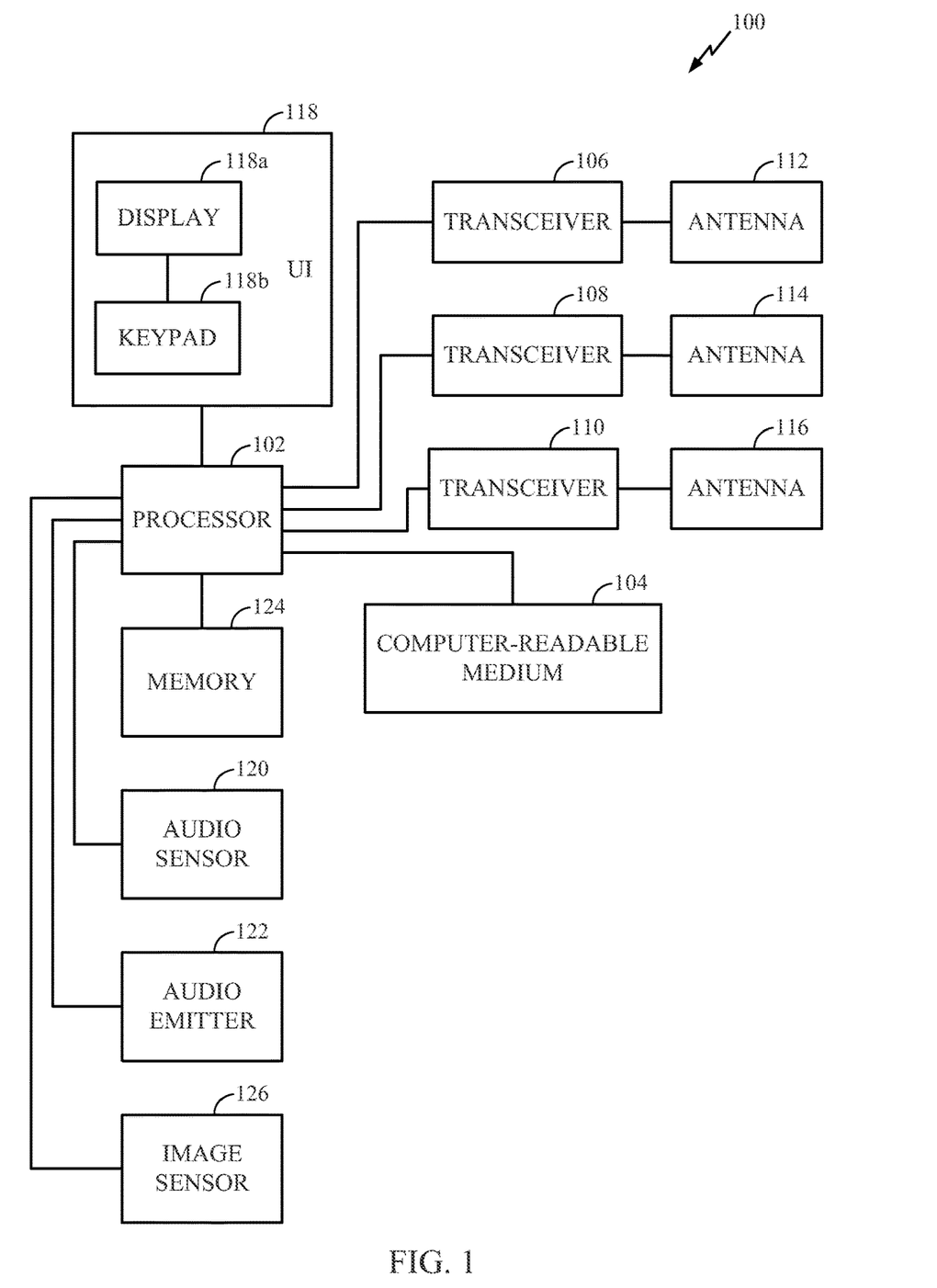
FIG. 1 is a block diagram illustrating an apparatus for selective admission for a sharing session.

FIG. 1 is a block diagram illustrating an apparatus 100 for selectively authorizing one or more client devices into a data sharing session in accordance with some aspects of the present disclosure. The apparatus 100 illustrated in FIG. 1 may represent a host device, which controls the session and is utilized to selectively admit the one or more client devices into the session. In another aspect, the apparatus 100 may represent the client device, which may or may not be admitted by the host to participate in the session.

The apparatus 100 includes a processor 102. By way of example, the processor 102 may be implemented with a "processing system" that includes one or more elements. Examples of processors that may be used in a processing system include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors 102 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 104. The computer-readable medium 104 may be a non-transitory computer-readable medium. A non-transitory computer-readable medium may include, by way of example, a magnetic storage device (e.g., hard disk, floppy disk, magnetic strip), an optical disc (e.g., compact disc (CD), digital versatile disc (DVD)), or a blu-ray disc (where disks usually reproduce data magnetically, while discs typically reproduce data optically with lasers), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. Combinations of the above should also be included within the scope of computer-readable media. The computer-readable medium 104 may be resident in the processing system, external to the processing system, or distributed across multiple entities including the processing system. The computer-readable medium 104 may be embodied in a computer-program product. By way of example, a computer-program product may include a computer-readable medium 104 in packaging materials. Those skilled in the art will recognize how best to implement the described functionality presented throughout this disclosure depending on the particular application and the overall design constraints imposed on the overall system.

The apparatus 100 may further include one or more transceivers (e.g., transceivers 106, 108, and 110). The transceivers generally provide a means for communicating with various other apparatus over a transmission medium. The illustrated example includes three wireless transceivers 106, 108, and 110, for communicating over a wireless air interface. This is intended only as an example, and various apparatus in accordance with aspects of the present disclosure may utilize one or more wired transceiver(s) (not illustrated), e.g., an Ethernet bridge, a serial or parallel interface, or any other suitable wired transceiver. In one example, a first transceiver 106 may be configured to establish a wireless wide area network (WWAN) connection, such as a cellular network utilizing any suitable air interface to communicate with a base station. For example, the first transceiver 106 may be configured for communication utilizing UMTS, LTE, cdmaOne, cdma2000, WiMAX, GSM, GPRS, or any other suitable wireless air interface. Here, the first transceiver 106 is coupled to at least one antenna 112 for transmitting and/or receiving information over the transmission medium. Further, some examples may include a second transceiver 108 configured to establish a wireless local area network (WLAN) connection. For example, the second transceiver 108 may be configured for communication utilizing an IEEE 802.11 air interface, or any other suitable air interface for establishing the WLAN. Here, the second transceiver 108 is coupled to at least one antenna 114 for transmitting and/or receiving information over the transmission medium. Further, some examples may include a third transceiver 110 configured to establish a wireless personal area network (WPAN) connection. For example, the third transceiver 110 may be configured for communication utilizing an IEEE 802.15.4, Bluetooth™, or any other suitable air interface for establishing the WPAN. Here, the third transceiver 110 is coupled to at least one antenna 116 for transmitting and/or receiving information over the transmission medium.

Depending upon the nature of the apparatus 100, a user interface (UI) 118 (e.g., display 118a, keypad 118b, joystick (not illustrated), etc.) may also be coupled to the processor 102. Further, the apparatus 100 may include an audio sensor 120, such as a microphone, and an audio emitter 122, such as a speaker. In this way audio input and output can be enabled for the processor 102, such that information may be provided to the apparatus 100 over a sonic medium to and/or from another apparatus. Further, the apparatus 100 may include an image sensor 126, such as a camera, for capturing still and/or moving images (e.g., video) over an optical medium. In some aspects of the disclosure, the image sensor 126 may be embodied as a charge coupled device (CCD) or any other suitable image sensing device, and may be configured to capture images utilizing the visible spectrum of light or any other suitable frequency of light emission such as infra-red, ultra-violet, etc.

The processor 102 may responsible for general processing, including the execution of software stored on the computer-readable medium 104. The software, when executed by the processor 102, causes the processing system to perform the various functions described infra for any particular apparatus. The computer-readable medium 104 may also be used for storing data that is manipulated by the processor 102 when executing software.

Figure 2:
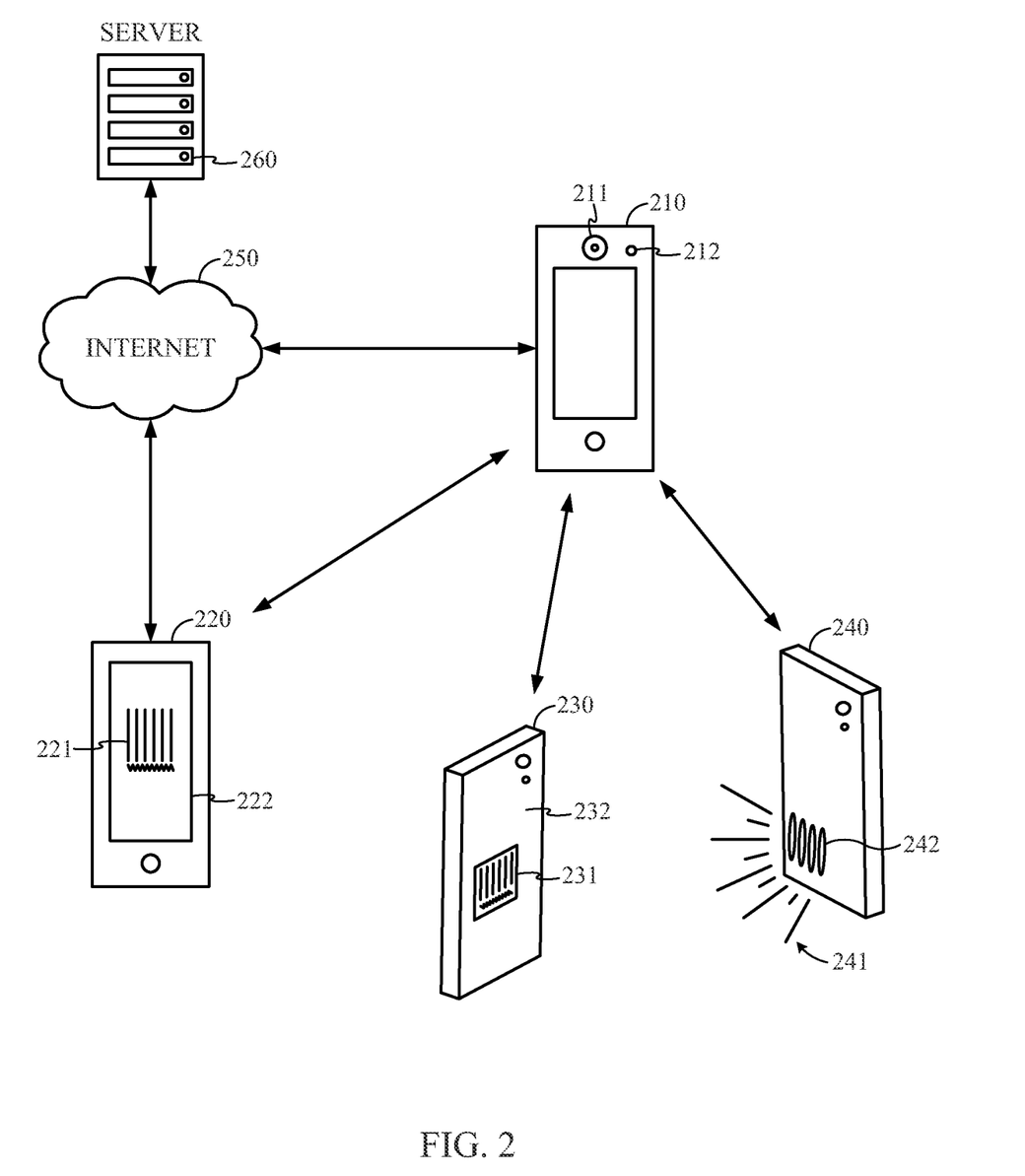
FIG. 2 is a schematic diagram illustrating a host and several users in a sharing session.

FIG. 2 is a simplified diagram illustrating a host device 210 and some client devices 220, 230, and 240 in a sharing session. Here, a host device 210 may offer access to the sharing session to the one or more client devices 220, 230, and 240. In some examples, the one or more clients may not be directly offered access, but they may request access to the host's network. In any case, the host and/or the client may wish to initiate a session in which network access for a sharing session may be granted to the client by the host.

For example, assume a user in possession of a client device 220 approaches the host device 210, and the client 220 wishes to participate in a session with the host 210. The client device 220 that the user possesses may be a mobile phone, a portable computer, a netbook, a tablet, a PDA, or any other suitable network-enabled device. The host device 210 may be another network enabled device (e.g., a mobile device) with interesting content to share, or a storefront with coupons to share, etc. One or both of the client device 220 and the host device 210 may be the apparatus 100 illustrated in FIG. 1.

In accordance with an aspect of the disclosure, the user of the host device 210 may determine to admit the client device 220 into the network sharing session. For example, the user of the host device 210 may personally know the user of the client device 220, or may visually identify the user of the client device 220 based on proximity, based on group participation in a sharing event, or for any other reason. Once the user of the host device 210 determines to admit the client device 220 into the sharing session, the host device 210 may be brought into proximity with the client device 220. For example, the host device 210 may include an optical sensor such as a camera that may be pointed toward the client device 220. Or, the host device 210 may include an audio sensor such as a microphone that may be located close to the client device. 220. Once the host device 210 and the client device 220 are proximately located, the admitted client device 220 may provide the host device 210 with a unique identifier. For example, the presentation of the unique identifier may utilize an audio and/or visual channel. This way, the presentation of the unique identifier utilizing the audio and/or visual channel does not necessarily require a complex process of setting up a wireless link by scanning across many possible channels or codes. Such a process may take a longer time than might be tolerable for short term ad-hoc sharing sessions with many participants. Further, the presentation of the unique identifier utilizing the audio and/or visual channel does not necessarily require either the admitted client device 220 or the host device 210 to be connected to a network, such as the Internet, utilizing one or more network interfaces. Still further, enhanced security can be achieved since the host admits the client based on both the proximity of the client (known due to the features of the optical or audio identifier communication), and the receipt of the identifier itself.

As illustrated at the first client device 220 in FIG. 2, the unique identifier may be an optical pattern 221 such as a bar code or a unique image displayed on the client device's mobile device display 222, configured to be detected by an image sensor 211 at the host 210, such as a camera, when the host device 210 and the client device 220 are suitably oriented (e.g., with the image sensor 211 directed toward the optical pattern 221). As illustrated at the second client device 230 in FIG. 2, the unique identifier may be an optical pattern 231 displayed on a surface 232 of the client device 230. For example, the optical pattern 231 is illustrated as being printed on a sticker, placed on a back surface 232 of the second client device 230. Of course, in other examples the optical pattern 231 may be engraved or printed on any suitable surface of the client device 230 in any suitable fashion such that it can be detected by a suitably oriented image sensor 211 at the host device 210. As illustrated at the third client device 240 in FIG. 2, the unique identifier may be carried by an audio signal 241 emitted from an audio emitter 242 of the third client device 240, such as a speaker or an acoustic resonator. The audio signal 241 may be an audible sound, but may alternatively be outside of the audible frequency range (e.g., an ultrasonic message), or may be any audio signal suitable for being detected by a suitably configured and positioned audio sensor 212 at the host device 210.

In an aspect of the disclosure, the presentation by the client device of the unique identifier to the host device 210 may be initiated by the user, and not the host. This is in contrast to a typical data sharing session, in which a host presents potential clients with a unique code, such as the 4-digit code typically used in a Bluetooth™ pairing session, which the clients then provide back to the host. These admission processes can present problems, in that the code needs to be provided to the clients in a secure fashion; and further, which individual client provided the code back to the host may not be known.

In some aspects of the disclosure, one or more of the client devices 220, 230, and 240 may directly communicate with the host device 210, for example, by a WLAN or WPAN. Further, in some aspects of the disclosure, one or more of the client devices, e.g., client device 220, may indirectly communicate with the host device 210 by way of a wide area network (WAN), such as the Internet 250. The interface between the client device 220 and the Internet 250 may be any suitable interface, including but not limited to a cellular air interface with a core network, a WLAN air interface with a router utilizing a backhaul connection to the Internet 250, a wired connection to the Internet 250, or any other suitable interface. Here, one or more servers 260 may be coupled to the WWAN and utilized to store certain information relating to the host device 210 and/or one or more of the client devices 220, 230, and 240, as well as to the sharing session itself. For example, the server 260 may be utilized for access control into the sharing session, may manage the sharing session, or may provide information to one or more of the clients and/or host.

Figure 3:
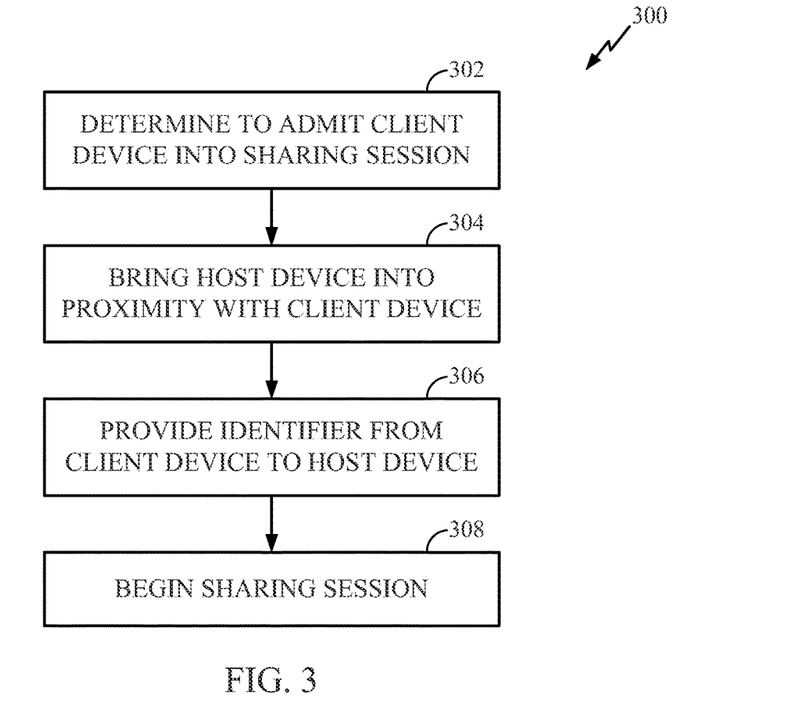
FIG. 3 is a flow chart illustrating a simplified process for selective admission for a sharing session in accordance with some aspects of the disclosure.

FIG. 3 is a flow chart 300 illustrating a simplified process for selectively admitting a client into a sharing session with a host. In accordance with some aspects of the disclosure, in block 302, a user of a host device determines to admit a client device into a network sharing session. For example, a group of individuals may congregate together, where one of the individuals possesses the host device. For any particular reason, this individual may select another one of the individuals from the group, who is in possession of a client device, to be admitted into the sharing session. The sharing session may be a new session to be established by admitting this client device, or the sharing session may be an ongoing session with one or more other client devices, which may be enabled to continue uninterrupted by the admittance of the new client device. Once the decision to admit the new client device into the sharing session is made, in block 304, the user of the host device may bring the host device into a suitable proximity to the client device. For example, the suitable proximity may be a distance and orientation such that an image sensor on the host device (e.g., image sensor 211 on host device 210) may detect and determine a visual identifier displayed by the client device (e.g., a bar code 221 displayed on client device 220). Alternately, the suitable proximity may be a distance and/or orientation such that an audio sensor at the host device may detect and determine an audio identifier emitted by an audio emitter at a client device (e.g., an audible signal 241 emitted by speaker 242 in client device 240). In block 306, an identifier may be received at the host device from the admitted client device, such that the admitted client device may be identified. For example, the identifier may be transmitted utilizing an optical pattern 221 or 231 utilizing a bar code, a two-dimensional code such as a data matrix code or a QR code, a predetermined unique image, or any other suitable optically identifiable code capable of communicating the identifier to the host. In another example, the identifier may be transmitted utilizing an acoustically coupled modem that uses encoded audio tones, or any other audible signal capable of communicating the identifier to the host. After receiving the identifier, in block 308, the sharing session may begin, e.g., by utilizing one of an active admission process, a passive point-to-point admission process, or a passive broadcast admission process. In some aspects of the disclosure, an additional step (not illustrated) may include some form of notification to the user of the host device that the new client device has been identified, enabling the user of the host device to confirm admittance of that user. However, in other aspects, upon receipt of the identifier from the client device it may be inferred that the client device is being admitted into the sharing session and the session may begin.

Figure 4:
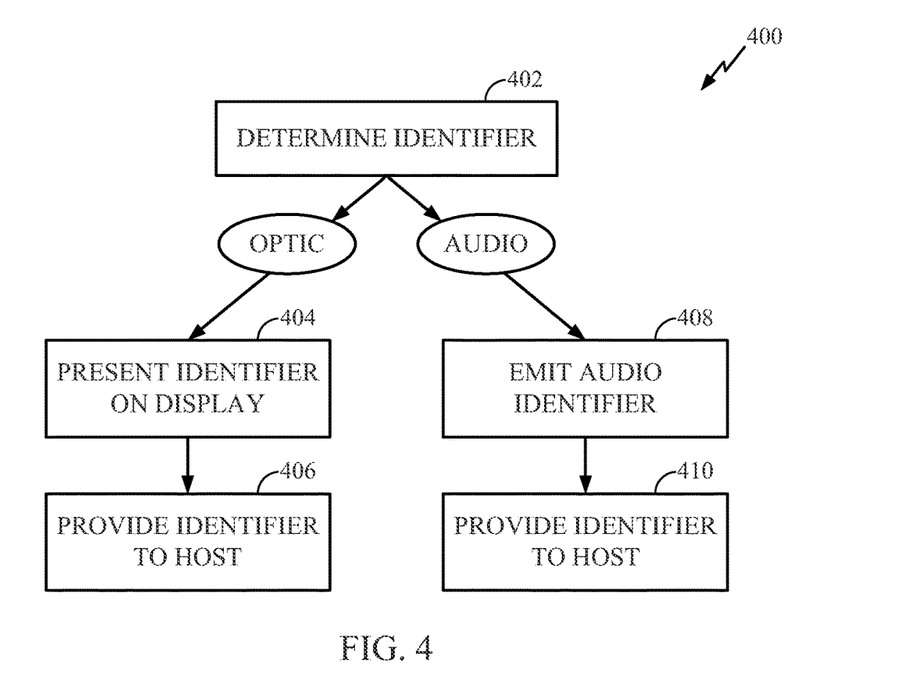
FIG. 4 is a flow chart illustrating additional details of a selective admission process in accordance with some aspects of the disclosure.

FIG. 4 is a flow chart 400 illustrating certain additional details of the selective admission process pertaining to the client within the simplified process illustrated in FIG. 3. In some aspects of the disclosure, the process illustrated in flow chart 400 may correspond to the provision of the identifier from the client device to the host device in block 304 of FIG. 3.

In block 402, the client device may determine the identifier to be provided to the host device. The determining of the identifier may be done by a processor within the client device; may be stored in memory within the client device; may be received at the client device from any suitable disparate source (e.g., being typed into a user interface in the client device), etc. In an optically-based system, in block 404, the determined identifier may be presented on a display on the client device. For example, the identifier may be encoded into a bar code, a QR code, or any other suitable visual encoding capable of providing the identifier to a host having an image sensor capable of imaging the display. In some aspects of the disclosure, the determination and display of the identifier are simplified, in that the identifier may be permanently imprinted, engraved, embossed, or otherwise written on a sticker or directly onto a surface of the client device. In block 406, the optical sensor of the host device is located proximate to the display (or the sticker or printed identifier) on the client device, such that the host device may image the identifier. In this way, the identifier can be presented to the host in a relatively secure fashion without necessitating the establishment of a wireless communication channel between the host and the client.

In an audio-based system, in block 408, the determined identifier may be emitted from an audio emitter of the client device. For example, the identifier may be encoded into an audio code such as utilized in a conventional audio modem, or may be encoded in any other suitable audio format capable of being detected by an audio sensor in the host device. In block 410, the audio sensor of the host device is located proximate to the audio emitter in the client device, such that the host device may detect the encoded identifier being audibly emitted by the client device. In this way, the identifier can be presented to the host device in a relatively secure fashion without necessitating the establishment of a wireless communication channel between the host and the client.

Active Admission

Figure 5:
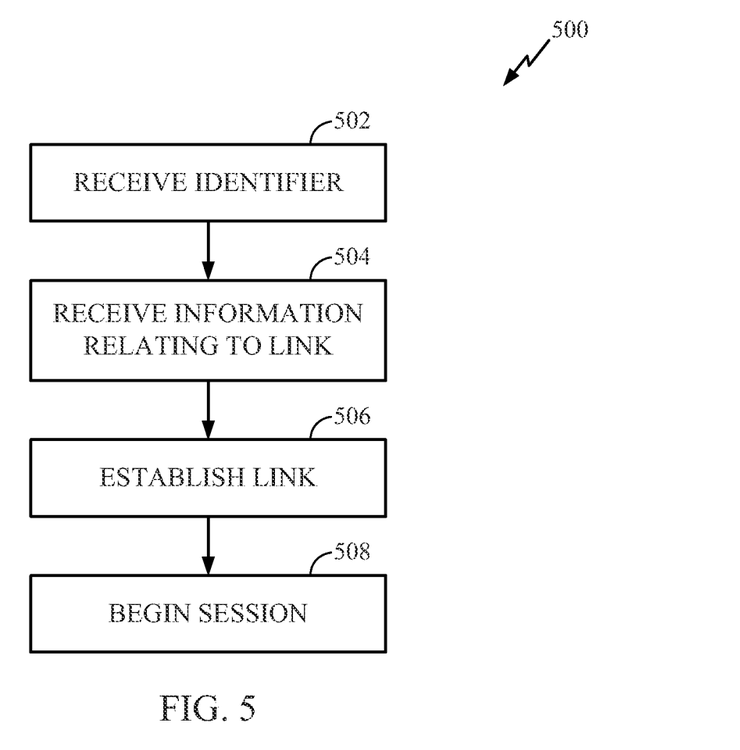
FIG. 5 is a flow chart illustrating an active admission process for a host in accordance with some aspects of the disclosure.

FIG. 5 is a flow chart 500 illustrating a simplified active admission process for a host in accordance with some aspects of the disclosure. Here, the active admission process may be utilized in block 308 in FIG. 3, wherein the sharing session begins.

To participate in the active admission process, the client device that presented the unique identifier for identifying the client device, may additionally present sufficient information to establish communication between the client and the host in the sharing session. Thus, in block 502, the host device receives the identifier from the client device as described above; and in block 504, the host device receives information relating to a link to be established between the user and the client. For example, the identifier including the additional information may include one or more parameters such as a user ID, a code or name identifying the technology in use, a list of physical channels monitored, MAC IDs, IP/Port address information, etc., such that the host may determine how to establish a link and communicate with the client in the sharing session. The host can accordingly decipher this information from the client by post processing the information obtained by the image sensor and/or audio sensor.

In block 506, the host may utilize one or more communication media characterized by the one or more parameters to establish a sharing session (e.g., a wireless communication session) with the participant who provided this information. For example, the identifier may include sufficient information to establish a WPAN including the host and the client devices on the personal area network. In another example, an ad-hoc Wi-Fi network between the host and the client devices over an available IEEE 802.11 wireless communication interface (i.e., utilizing an 802.11 compatible transceiver in each of the client and the host devices). In another example, the identifier may include an IP address or other suitable network identification information such that the host can set up a data sharing session with the client through independent respective connections to a network such as the Internet. Here, the host and the client need not necessarily have a direct wireless communication channel, but may communicate to each other through a server in the network, with parameters of the session provided by the client to the host as described above. In block 508, after the link is established between the client and the host, the sharing session may begin.

Figure 6:
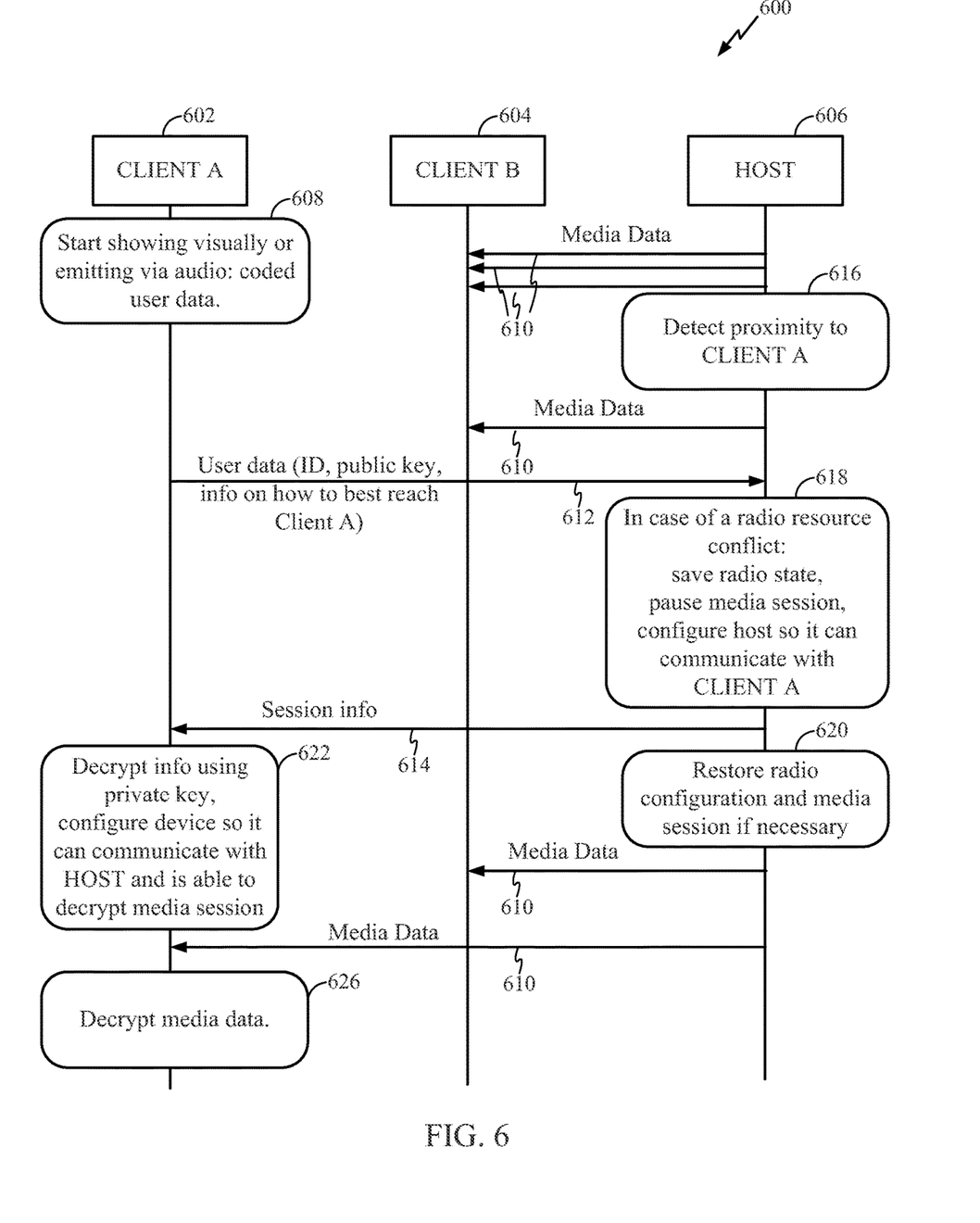
FIG. 6 is a call flow diagram illustrating additional details of a particular active admission process in accordance with some aspects of the disclosure.

FIG. 6 is a call flow diagram 600 illustrating an active admission process for a host in accordance with some aspects of the disclosure. Here, the active admission process may be utilized in block 304, 306 and 308 in FIG. 3, wherein the sharing session is expanded by an additional client.

Here, host 606 may be busy serving media data 610 to client B 604 using the very radio resource that client A 602 desires to utilize when it advertises during an initial contact in 612.

To participate in the active admission process, client A 602 presents a unique identifier for identifying the client device in block 608. Here, the unique identifier presented by client A 602 may additionally include sufficient information to establish communication between client A 602 and the host 606 in a sharing session. At block 616, the host 606 detects that it is in proximity to client A, e.g., by having its user point the host device 606 toward the client A 602. After detecting proximity to client A 602, host 606 is capable of receiving the identifier 612 and the information relating to a link to be established between client A 602 and the host 606 as described above. For example, the identifier including the additional information may include one or more parameters such as a user ID, a code or name identifying the technology in use, a list of physical channels monitored, MAC IDs, IP/Port address information, etc., such that the host 606 may determine how to establish a link and communicate with the client A 602 in the sharing session. The host 606 can accordingly decipher this information from the client A 602 by post processing the information obtained by the image sensor and/or audio sensor. Should the new client A 602 request to be contacted via a radio resource that is currently in use at host 606 to serve other clients, such as client B 604, then in block 618, host 606 may save the radio and session state and configure communication means so that the host 606 can communicate with client A 602 without having to scan channels or other variants of possible communication.

In message 614, the host 606 may utilize one or more communication media characterized by the one or more parameters to establish a sharing session (e.g., a wireless communication session) with the participant who provided this information, i.e., client A 602. For example, the identifier may include sufficient information to establish a WPAN including the host and the client devices on the personal area network. In another example, an ad-hoc Wi-Fi network between the host 606 and the client device 602 over an available IEEE 802.11 wireless communication interface (i.e., utilizing an 802.11 compatible transceiver in each of the client 602 and the host 606). In another example, the identifier may include an IP address or other suitable network identification information such that the host can set up a data sharing session with the client 602 through independent respective connections to a network such as the Internet. Here, the host 606 and the client 602 need not necessarily have a direct wireless communication channel, but may communicate to each other through a server in the network, with parameters of the session provided by the client 602 to the host 606 as described above. After communicating with client A 602, in block 620, the host 606 may restore the radio and session configuration saved in block 618 if necessary, as determined in block 618, and may provide media data 610 to both new client A 602 and previous client B 604. In optional block 626, after client A 602 has configured its communication means and decrypting capabilities according to session info 614.

Passive Point-to-Point Admission

Figure 7:
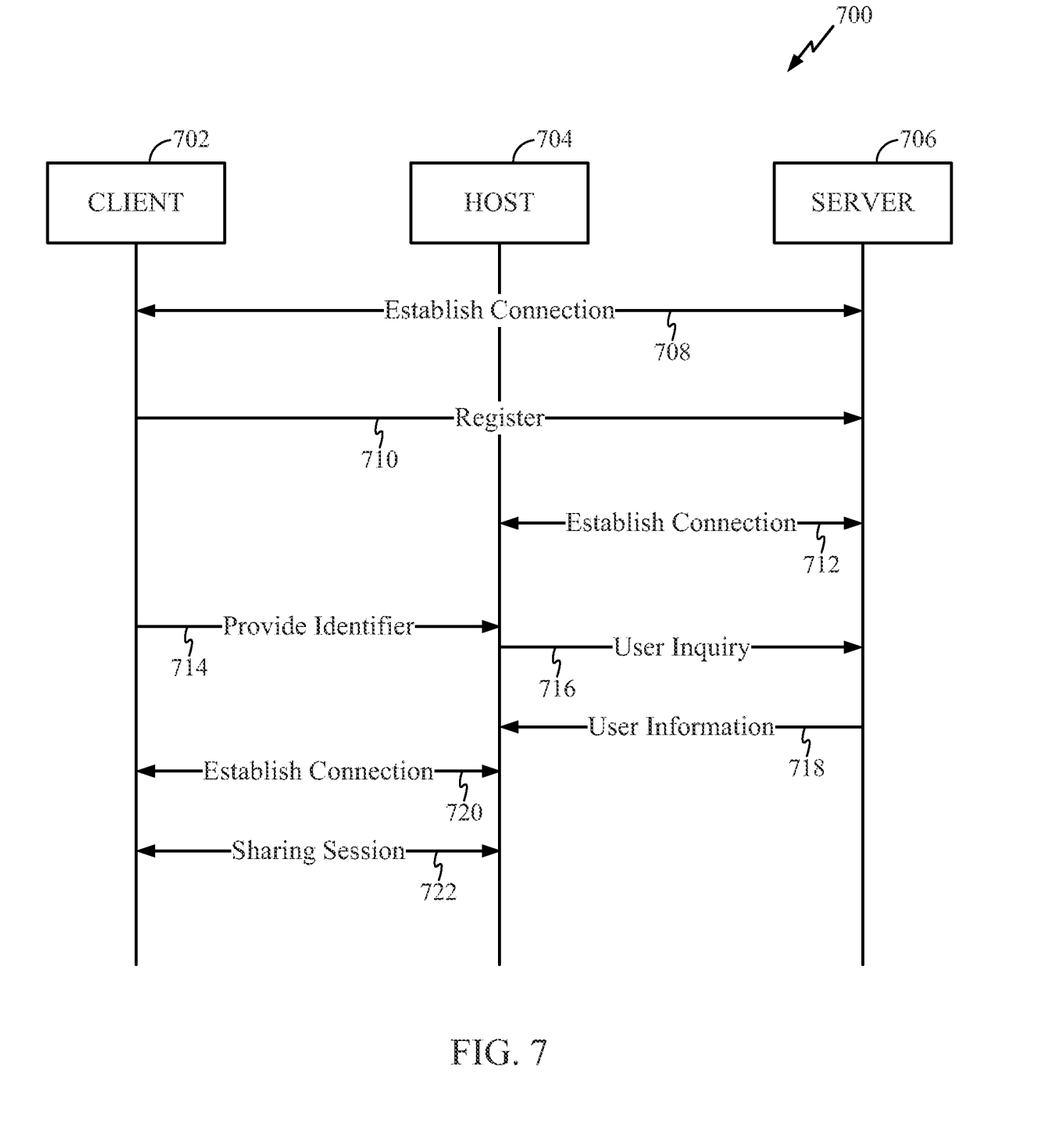
FIG. 7 is a call flow diagram illustrating a passive point-to-point admission process in accordance with some aspects of the disclosure.

FIG. 7 is a call flow diagram 700 illustrating a passive point-to-point admission process in accordance with some aspects of the disclosure. Here, the passive point-to-point admission process may be utilized in block 308 in FIG. 3, wherein the admission of the client 702 into the sharing session with the host 704 is determined by utilizing a server 706.

To participate in the passive point-to-point admission process, the host 704 and the client 702 may each establish a communication channel to a server 706. For example, the host 704 and the client 702 may each establish a connection to a wide area network such as the Internet, and may each access a server 706 (e.g., the server 260 illustrated in FIG. 2). This way, the server can enable the host 704 to reach a particular client 702 by presenting a key identifier to the server. In some aspects of the disclosure, the client 702 may have already pre-registered with the server 706 such that additional information may not be necessary to send to the sever 706 during the immediate sharing session initiation procedure.

For example, the client 702 may establish a wireless connection to the Internet (e.g., utilizing a cellular air interface or any other suitable transceiver), and thereby establish a connection 708 with the server 706. Utilizing this connection, the client 702 may register 710 with the server 706 utilizing information such as the client's unique identification information. Such a registration 710 can enable the server 706 to associate the unique identification information with the client 702. Further, the registration 710 may include the client 702 providing information about the client's 702 capabilities, such as transceivers available for communication with the host 704, for the desired sharing session to take place between the client 702 and the host 704.

The host 704 may additionally establish a connection 712 with the server 706, e.g., by establishing a wireless connection to a cellular network providing a tunnel to the Internet, so that the host 704 may communicate with the server 706.

As described above, the client 702 provides an identifier 714 to the host 704, e.g., utilizing the optical and/or audio process described above. The host 704 may then send a user inquiry 716, including the identifier, to the server 706 utilizing its respective connection to the server 706 to inquire about the identification information, and how to contact the client 702. The server 706 may then send a suitable response including user information 718, such as routing information, to enable the host 704 to access the client 702. The host 704 may then process this information and determine how to establish the connection with the client 702. If desired, the host 704 and the client 702 may then establish a connection 720, and begin a sharing session 722.

In some aspects of the disclosure, the data sharing session 722 between the host 704 and the client 702 may utilize the Internet by way of the server 706, or another route through the network. In another aspect of the disclosure, the data sharing session 722 may utilize a separate, direct, ad-hoc wireless connection established in accordance with the information obtained from the server 706. In another aspect of the disclosure, the host 704 and the client 702 may enter a data sharing session utilizing any suitable communication interface or channel as indicated by the server 706.

Passive Broadcast Admission

Figure 8:
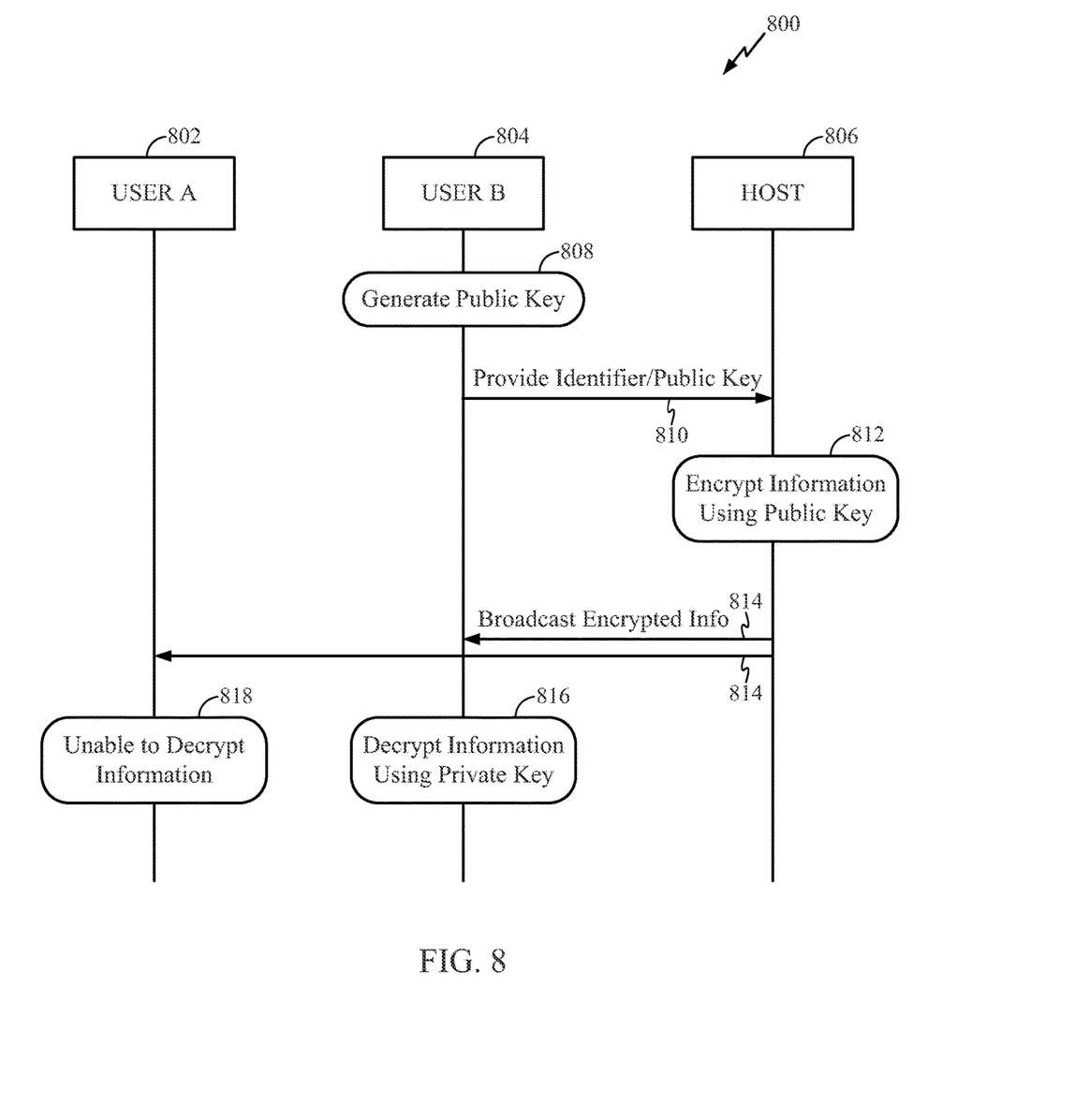
FIG. 8 is a call flow diagram illustrating a passive broadcast admission process in accordance with some aspects of the disclosure.

FIG. 8 is a call flow diagram 800 illustrating a passive broadcast admission process in accordance with some aspects of the disclosure. Here, the passive broadcast admission process may be utilized in block 308 in FIG. 3, wherein the host 806 determines whether to admit client A 802 and client B 804 in accordance with respective identifiers, and encrypts information to be broadcasted in a broadcast sharing session utilizing a public key corresponding to the admitted client.

To participate in the passive broadcast admission process, an admitted client 804 wishing to participate in a sharing session generates a public key 808. Here, the public key is generated in accordance with a private key known only to the admitted client 804 that generates the public key. In some aspects of the disclosure, the public key may be hard-coded, e.g., by being permanently encoded onto a sticker or an engraved bar code on a surface of the admitted client 804. In some aspects of the disclosure, the public key may be derived from or identical to the emitted participant ID. The admitted client 804 provides an identifier 810 to the host 806 utilizing the selective optical and/or audio admission process described above. Here, the identifier includes the public key generated by the admitted client 804.

After receiving the identifier/public key from the admitted client 804, the host 806 may then encrypt information 812 utilizing the public key. This encrypted information may then be broadcasted 814 over an unsecure channel, which may be received by the admitted client 804 to which the information is directed, as well as one or more disparate clients 802 capable of accessing the broadcast channel. The admitted client 804 that generated the public key, being in possession of the corresponding private key, may decrypt the information 816 and receive the information provided from the host 806. However, the disparate client 802 that lacks the corresponding private key is unable to decrypt the information 818. In this way a secure broadcast can be achieved utilizing the selective admission process described herein.

In some aspects of the disclosure, more than one client device may provide public key or keys to the host 806, and the host 806 may suitably package the information utilizing the corresponding public keys such that the broadcast of encrypted information may be thereby decrypted by any of those users that have been identified by the host 806.

Referring to FIG. 1, in one configuration, the apparatus 100 includes means for determining to admit a client device into a network sharing session with a host device, means for detecting that the client device is proximate to the host device, means for receiving an identifier from the admitted client device for identifying the admitted client device, and means for establishing the network sharing session utilizing the identifier. The aforementioned means may include the apparatus 100 configured to perform the functions recited by the aforementioned means. As described supra, the apparatus 100 may include the processor 102, the memory 124, the audio sensor 120, the image sensor 126, and/or one or more transceivers 106, 108, and/or 110 configured to perform the functions recited by the aforementioned means.

In another configuration, the apparatus 100 includes means for providing, from an admitted client device admitted into the sharing session, an identifier for identifying the admitted client device to the host device, and means for establishing a link with the host device for communication over the sharing session. The aforementioned means may include the apparatus 100 configured to perform the functions recited by the aforementioned means. As described supra, the apparatus 100 may include the processor 102, the memory 124, the audio emitter 122, the user interface 118, and/or one or more transceivers 106, 108, and/or 110 configured to perform the functions recited by the aforementioned means.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of selective authorization, comprising:
   determining to admit a client device into a network sharing session with a host device to share data from the host device;
   detecting a proximity of the host device to the client device;
   obtaining an identifier from the client device through at least one of an audio sensor or an optical sensor of the host device based on the detected proximity of the host device to the client device, the identifier including identification information for identifying the client device, wherein providing of the identifier is initiated by a user of the client device;
   establishing a network connection with a server;
   providing the identifier including identification information for identifying the client device to the server;
   receiving client information from the server, the client information for establishing the sharing session between the host device and the client device to share data from the host device;
   providing notification to a user of the host device that the client device has been identified; and
   establishing a direct, ad-hoc wireless connection with the admitted client device utilizing the client information received from the server.

2. The method of claim 1, wherein the identifier comprises a visual image associated with the admitted client device.

3. The method of claim 2, wherein the visual image comprises a displayed image provided on a video display device coupled to the admitted client device.

4. The method of claim 2, wherein the visual image comprises at least one of a bar code, a Quick Response (QR) code, or a data matrix code.

5. The method of claim 1, wherein the identifier comprises an audio signal emitted by an audio emitter coupled to the admitted client device.

6. The method of claim 5, wherein the audio signal comprises one or more encoded audio tones.

7. The method of claim 1, wherein the identifier comprises one or more of: a code or name identifying a technology to utilize for the network sharing session, an identification of one or more physical channels monitored by the admitted client device, a media access control identifier (MAC ID) of the client device, or Internet Protocol/Port (IP/Port) address information for the admitted client device.

8. The method of claim 1, further comprising:
   receiving confirmation from the user of the host device to confirm admittance of the client device.

9. An apparatus for selective authorization, comprising:
   a processor; and
   a memory coupled to the processor, wherein the processor is configured to:
   determine to admit a client device into a network sharing session with a host device to share data from the host device;
   detect a proximity of the host device to the client device;
   obtain an identifier from the client device through at least one of an audio sensor or an optical sensor of the host device based on the detected proximity of the host device to the client device, the identifier including identification information for identifying the client device, wherein providing of the identifier is initiated by a user of the client device;
   establish a network connection with a server;
   provide the identifier including identification information for identifying the client device to the server;
   receive client information from the server, the client information for establishing the sharing session between the host device and the client device to share data from the host device;
   provide notification to a user of the host device that the client device has been identified; and
   establish a direct, ad-hoc wireless connection with the admitted client device utilizing the client information received from the server.

10. The apparatus of claim 9, wherein the identifier comprises a visual image associated with the admitted client device.

11. The apparatus of claim 10, wherein the visual image comprises a displayed image provided on a video display device coupled to the admitted client device.

12. The apparatus of claim 10, wherein the visual image comprises at least one of a bar code, a Quick Response (QR) code, or a data matrix code.

13. The apparatus of claim 9, wherein to obtain the identifier, the processor is configured to sense an audio signal emitted by an audio emitter coupled to the admitted client device.

14. The apparatus of claim 13, wherein the audio signal comprises one or more encoded audio tones.

15. The apparatus of claim 9, wherein the identifier comprises one or more of: a code or name identifying a technology to utilize for the network sharing session, an identification of one or more physical channels monitored by the admitted client device, a media access control identifier (MAC ID) of the client device, or Internet Protocol/Port (IP/Port) address information for the admitted client device.

16. An apparatus for selective authorization, comprising:
   means for determining to admit a client device into a network sharing session with a host device to share data from the host device;
   means for detecting a proximity of the host device to the client device;
   means for obtaining an identifier from the client device through at least one of an audio sensor or an optical sensor of the host device based on the detected proximity of the host device to the client device, the identifier including identification information for identifying the client device, wherein providing of the identifier is initiated by a user of the client device;
   means for establishing a network connection with a server;
   means for providing the identifier including identification information for identifying the client device to the server;
   means for receiving client information from the server, the client information for establishing the sharing session between the host device and the client device to share data from the host device;
   means for providing notification to a user of the host device that the client device has been identified; and
   means for establishing a direct, ad-hoc wireless connection with the admitted client device utilizing the client information received from the server.

17. A non-transitory computer-readable medium comprising:
   instructions for causing a computer to determine to admit a client device into a network sharing session with a host device to share data from the host device;
   instructions for causing a computer to detect a proximity of the host device to the client device;

instructions for causing a computer to obtain an identifier from the client device through at least one of an audio sensor or an optical sensor of the host device based on the detected proximity of the host device to the client device, the identifier including identification information for identifying the client device, wherein providing of the identifier is initiated by a user of the client device;

instructions for causing a computer to establish a network connection with a server;

instructions for causing a computer to provide the identifier including identification information for identifying the client device to the server;

instructions for causing a computer to receive client information from the server, the client information for establishing the sharing session between the host device and the client device to share data from the host device;

instructions for causing a computer to provide notification to a user of the host device that the client device has been identified; and instructions for causing a computer to establish a direct, ad-hoc wireless connection with the admitted client device utilizing the client information received from the server.

* * * * *